United States Patent [19]
Proia

[11] Patent Number: 5,220,972
[45] Date of Patent: Jun. 22, 1993

[54] SELF-TRACKING, REAR VEHICLE SUSPENSION SYSTEM FOR TRUCKS, TRAILERS & BUSES

[76] Inventor: Cataldo Proia, 127 W. Embargo St., Rome, N.Y. 13440

[21] Appl. No.: 925,106

[22] Filed: Aug. 6, 1992

[51] Int. Cl.$^5$ .............................................. B62D 61/00
[52] U.S. Cl. .................. 180/24.01; 280/81.6
[58] Field of Search ................... 180/24.01; 280/81.6, 280/694, 718; 267/40, 47, 260, 262, 36.1

[56] References Cited

U.S. PATENT DOCUMENTS

| | | | |
|---|---|---|---|
| 2,227,448 | 1/1941 | Freeman | 267/36.1 |
| 2,776,846 | 1/1957 | Willock | 180/24.01 |
| 3,204,977 | 9/1965 | Eisenhauer et al. | 280/81.6 |
| 3,768,829 | 10/1973 | Colovas et al. | 280/724 |
| 4,120,509 | 10/1978 | Reeve et al. | 280/81.6 |
| 5,088,570 | 2/1992 | Loeber | 180/24.01 |

Primary Examiner—Tamara L. Graysay
Attorney, Agent, or Firm—Katherine McGuire

[57] ABSTRACT

Apparatus and method of providing self-tracking rear axles on non-articulated vehicles having more than one rear axle. In existing suspension systems employing torque rods which lie substantially parallel to the longitudinal center-line of the vehicle, the forward ends of each pair of torque rods are moved laterally inwardly toward each other and the vehicle center-line and remounted to one of the frame or associated rear axle (the same one on which the forward end was originally mounted). The forward ends of each torque rod pair are also laterally spaced from each other to provide separate reaction forces at each forward end which provides the self-tracking movement of the rear axles upon cornering. Shock absorbers are also modified to accept lateral deflection. Other specialized suspension modifications are disclosed as they relate to specific existing suspension types.

20 Claims, 18 Drawing Sheets

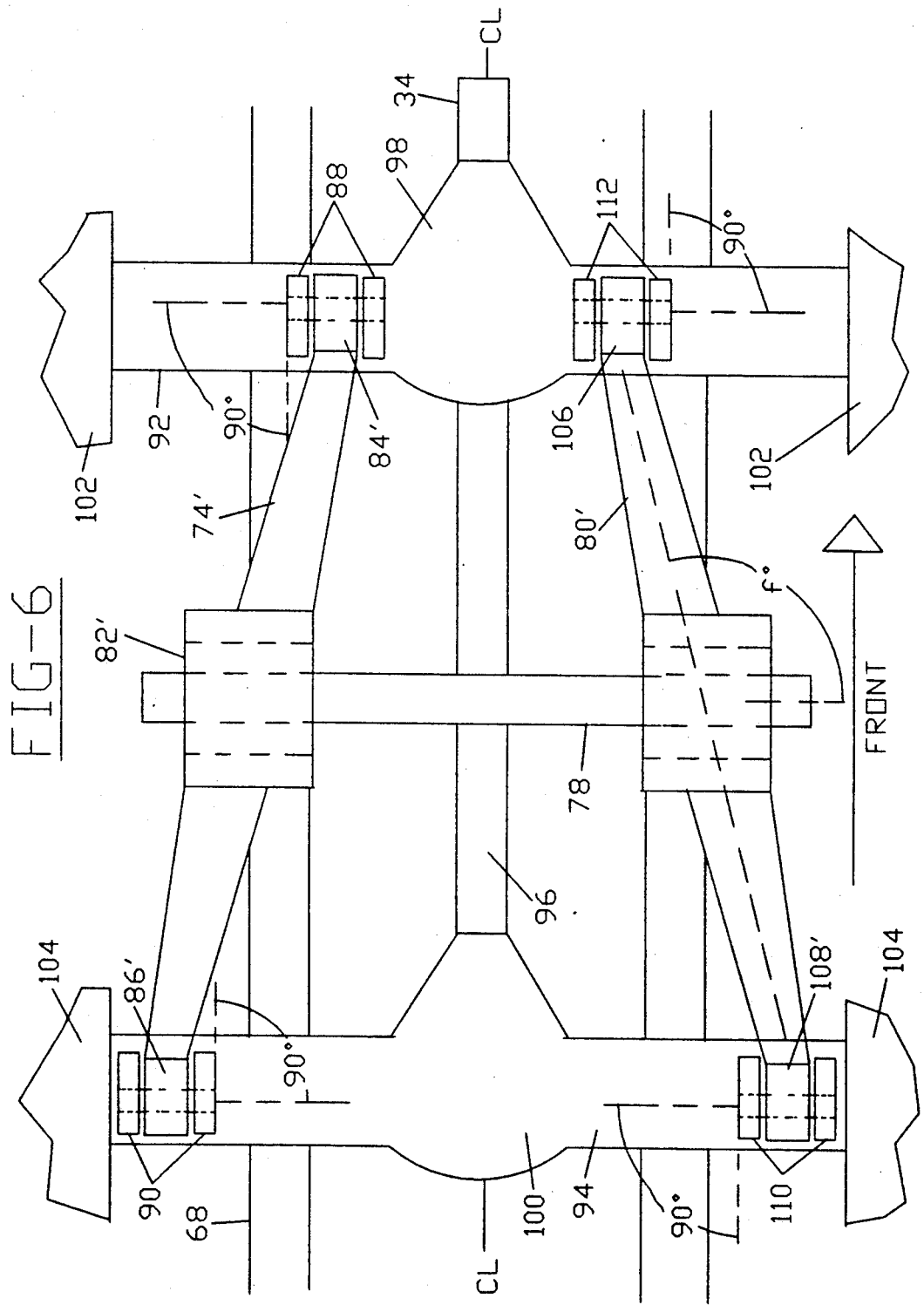

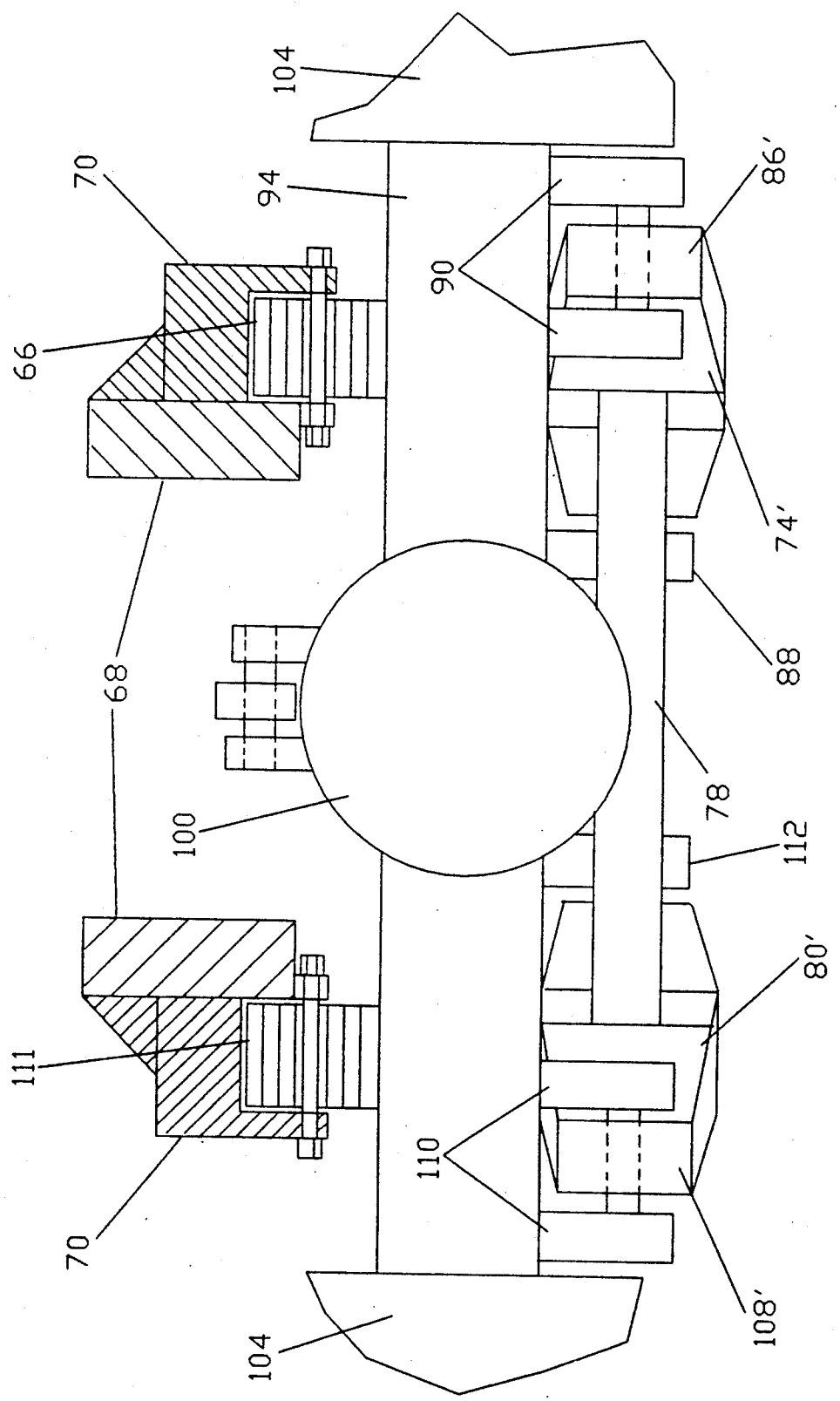

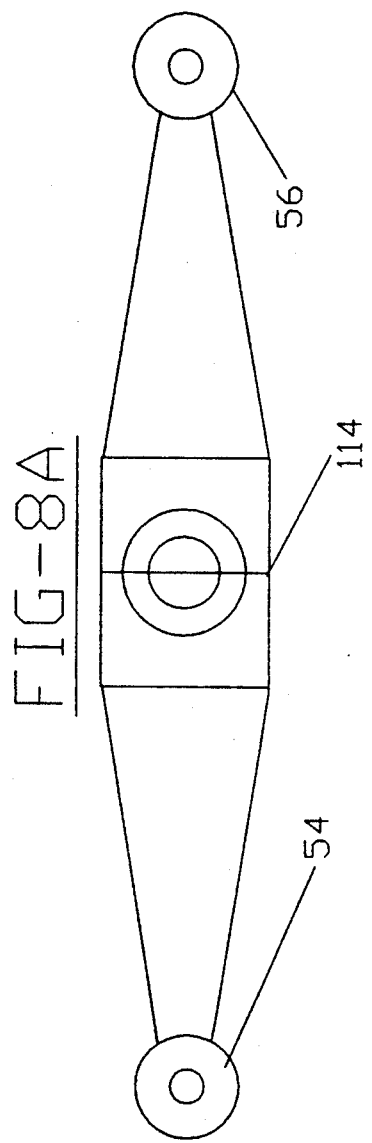
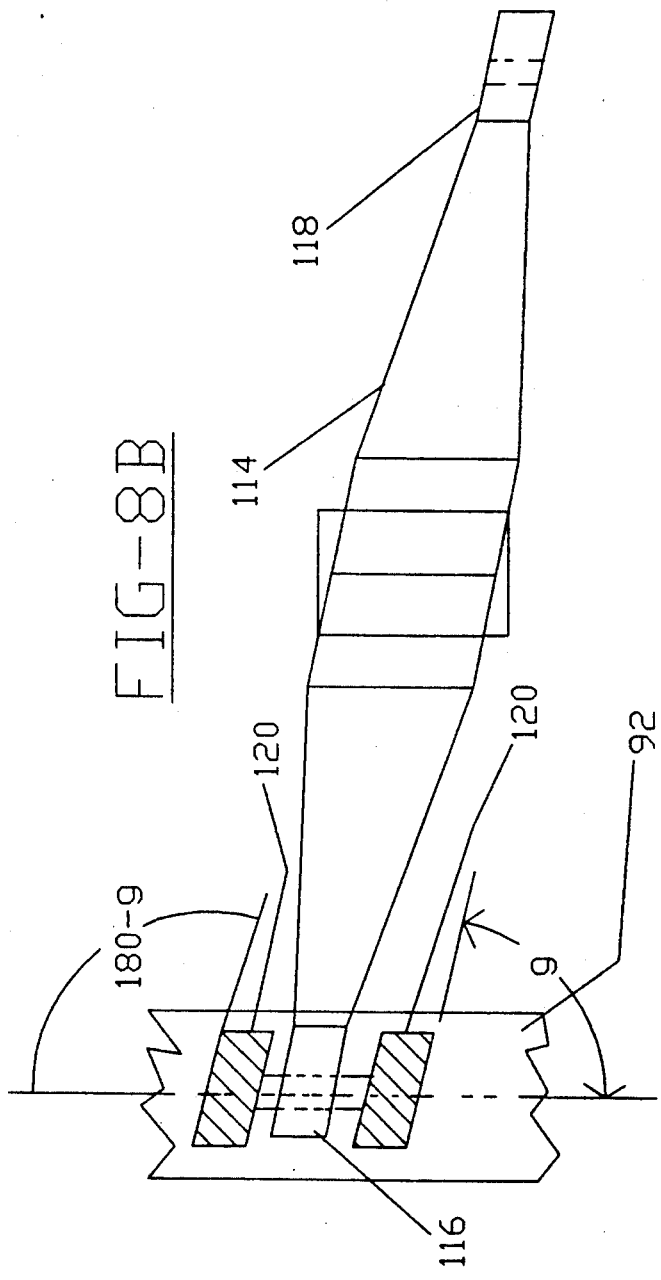

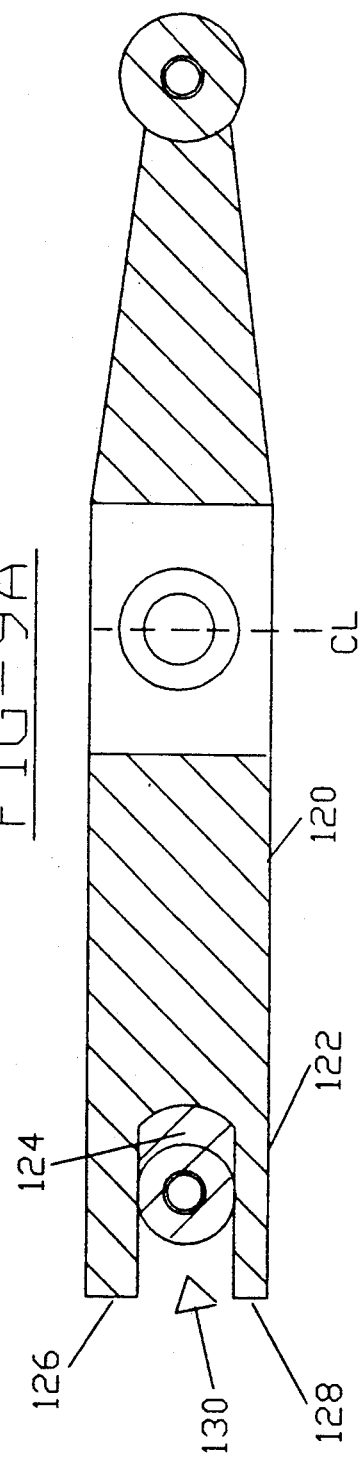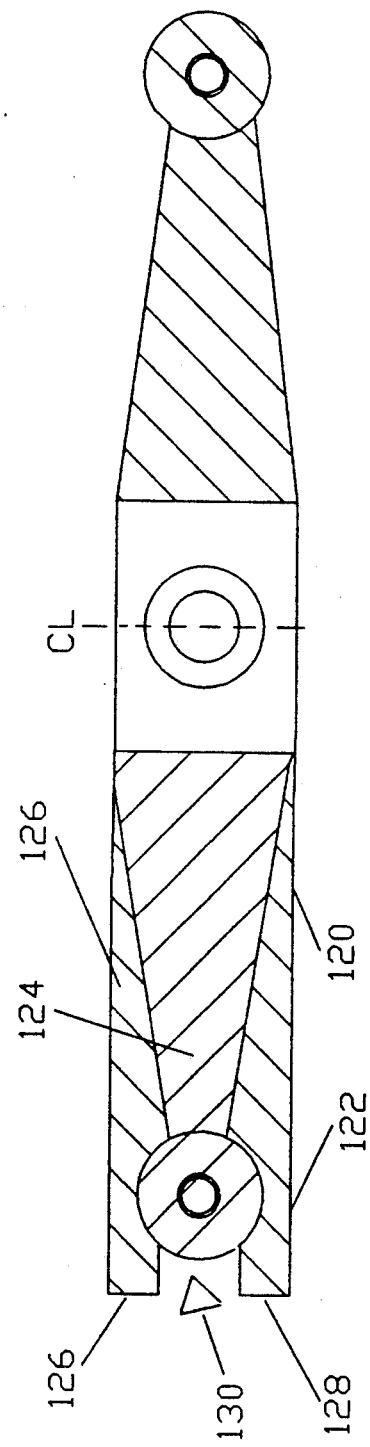

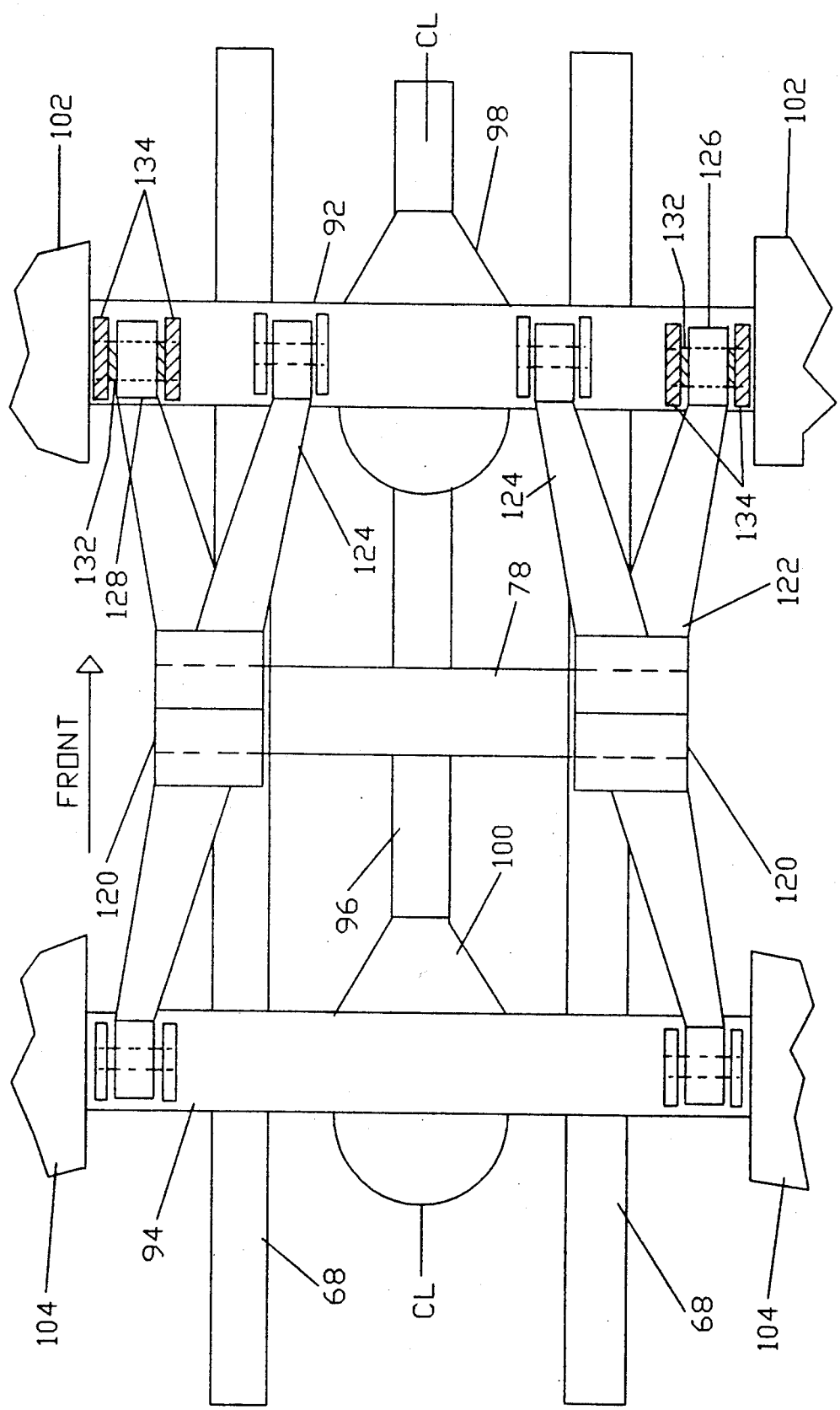

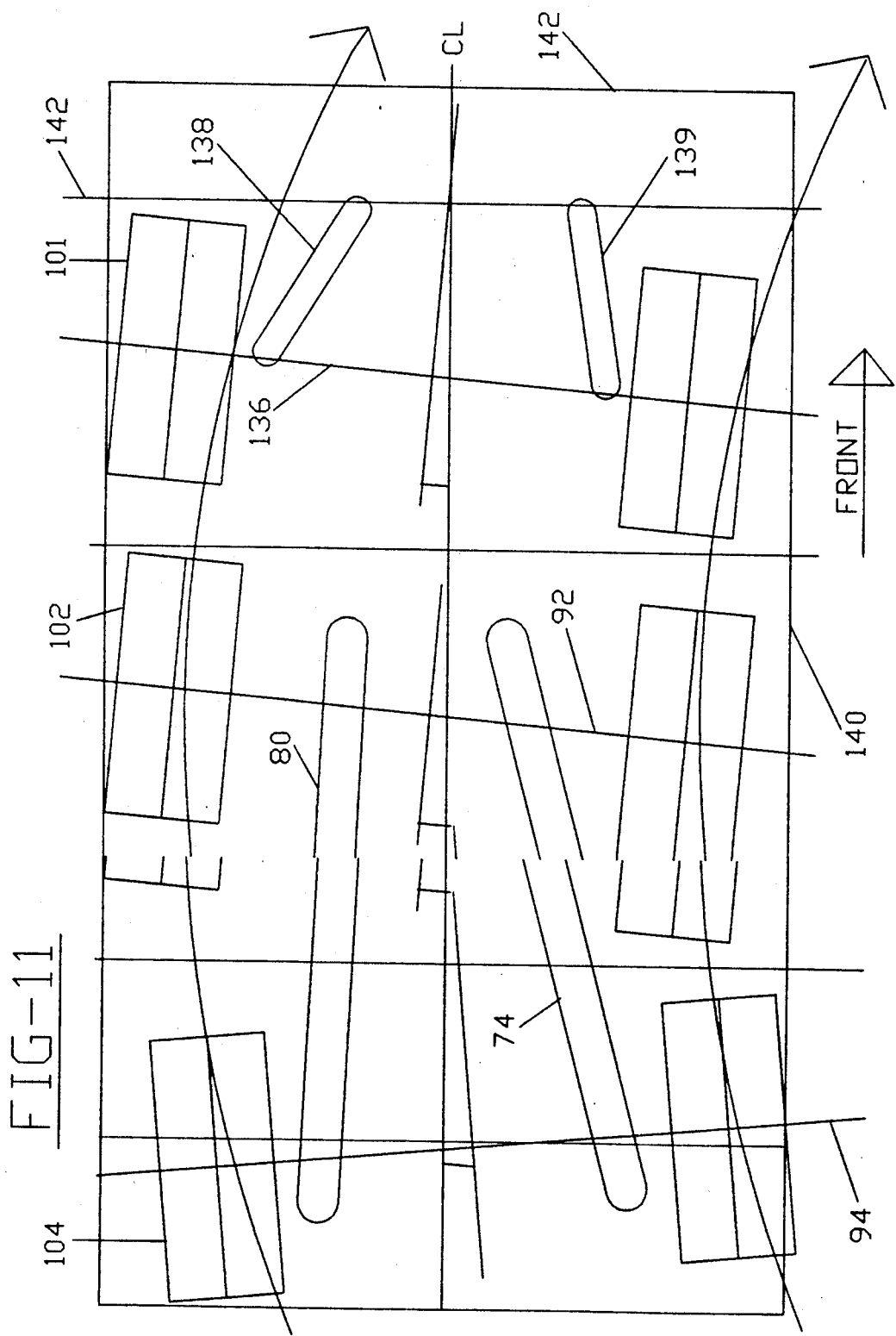

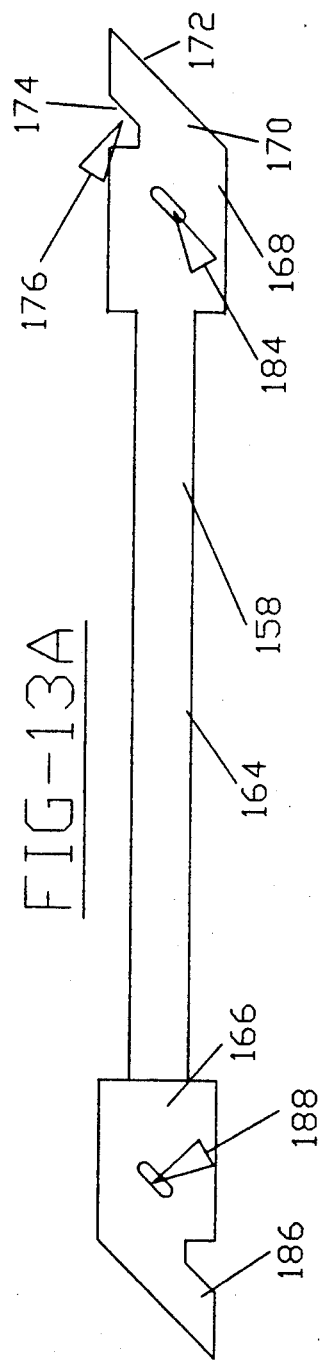
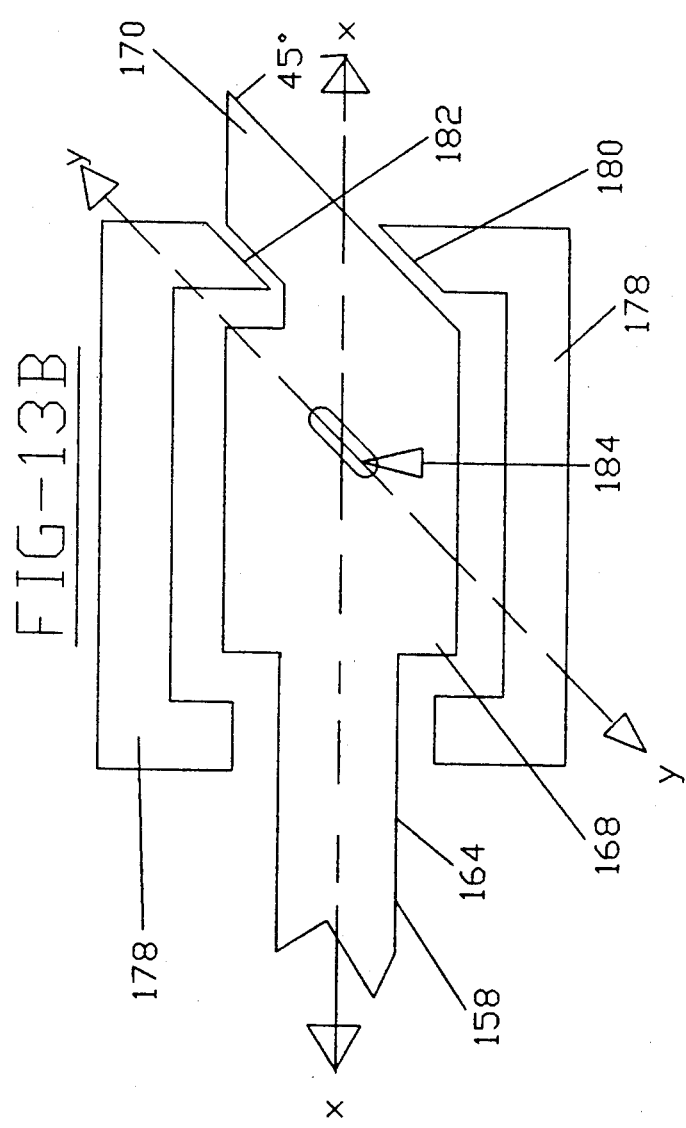

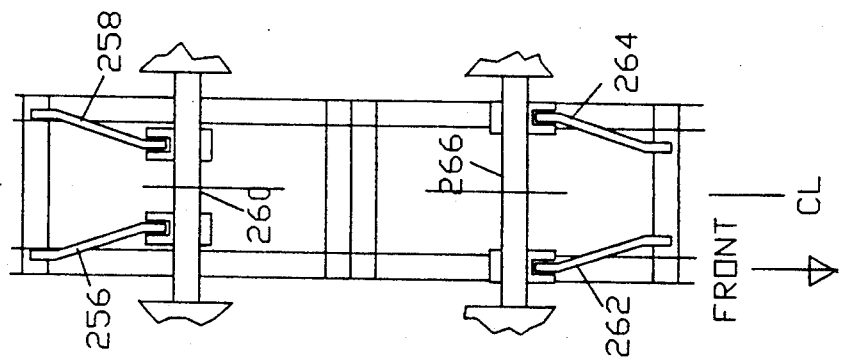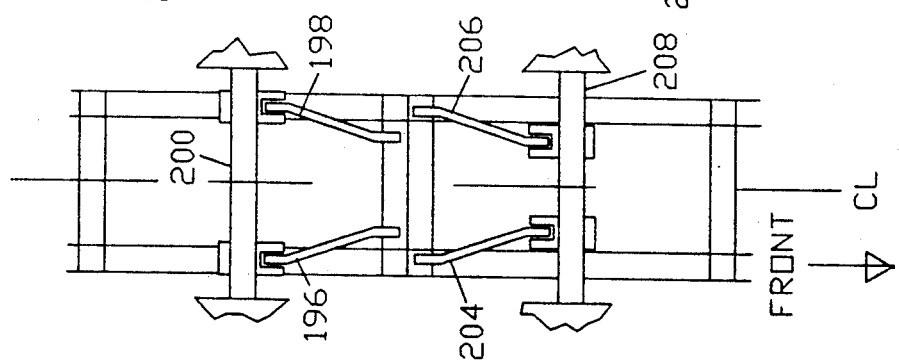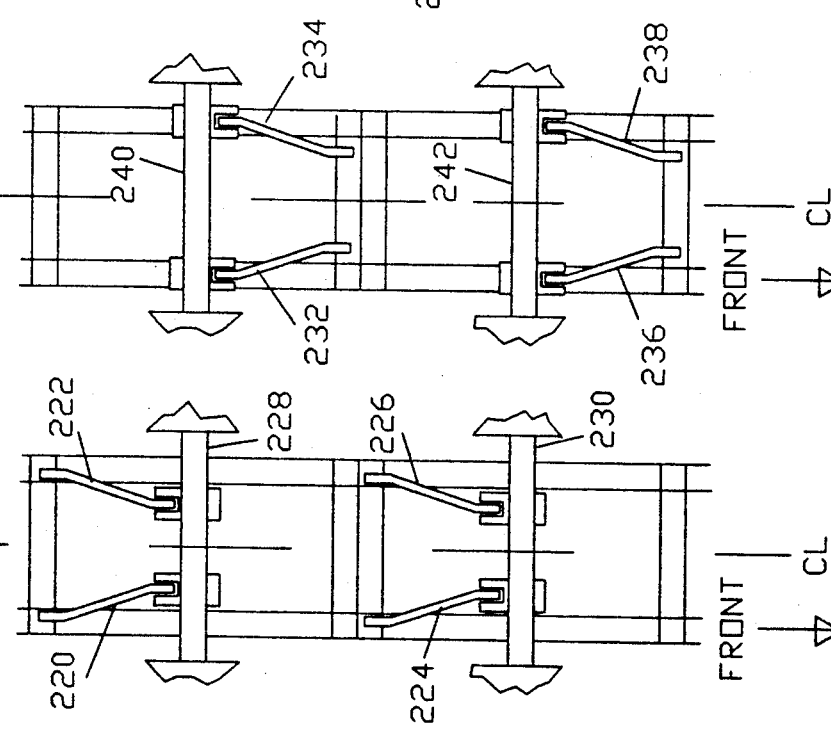

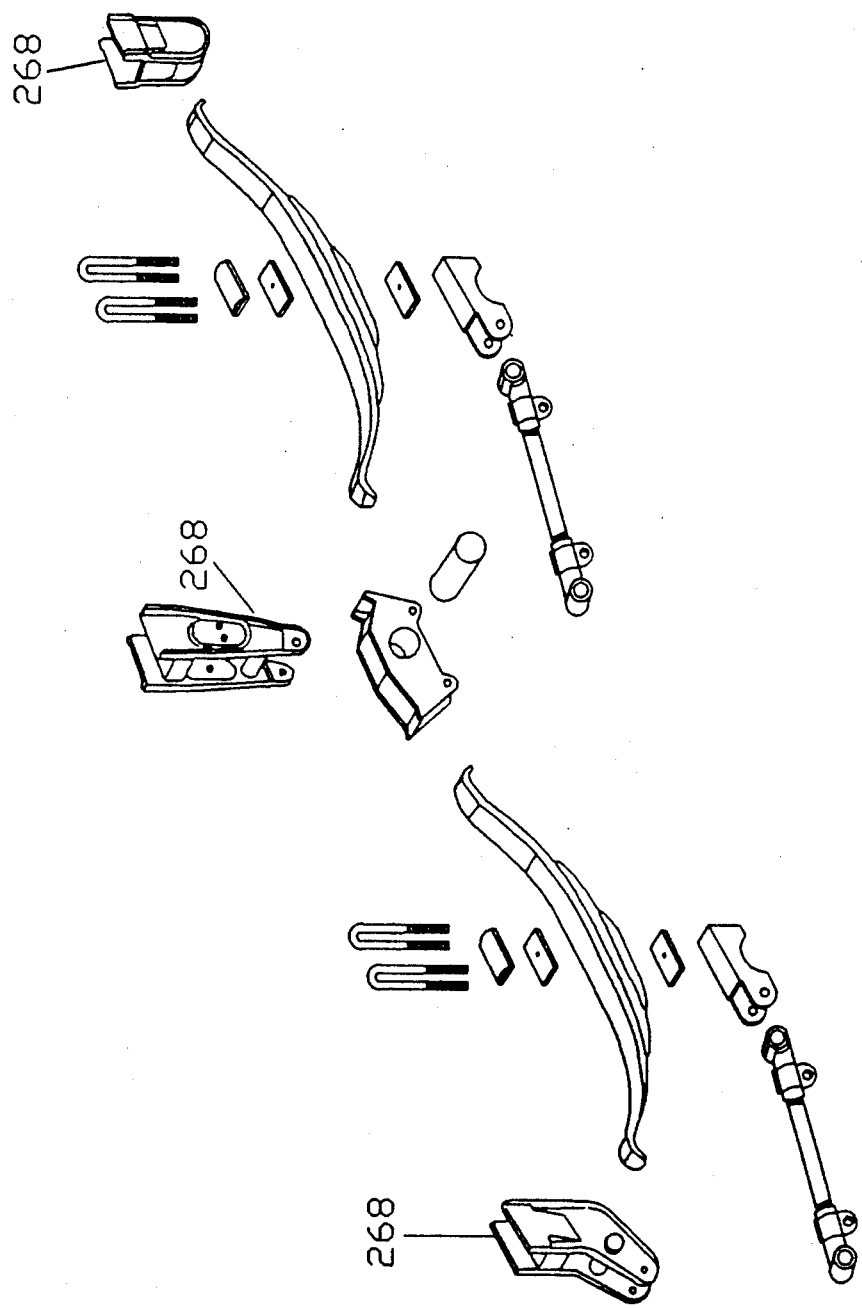

SELF-TRACKING, REAR VEHICLE SUSPENSION SYSTEM FOR TRUCKS, TRAILERS & BUSES

BACKGROUND OF THE INVENTION

This invention relates to suspension systems and, more particularly, to a suspension system for heavy duty trucks, trailers and buses which permit the rear axles thereof to track around corners.

Suspension systems are comprised of springs and dampers or "shock absorbers" which attach to and between the body and tires of the vehicle. The suspension system cushions the occupants and cargo in the vehicle from irregularities in the road surface as well as insure the wheels stay in contact with the road to provide adequate grip for accelerating, braking and cornering. One type of spring which is widely used on the rear axle is the multi-leaf spring which is typically semi-elliptical in shape but may also be of substantially planar configuration. The multi-leaf spring is useful since it also provides damping in addition to providing the function of locating the rear axle, holding it in a set position except for allowing vertical motion with respect to the vehicle chassis.

Other types of springs include the air spring and coil spring. In many rear axles of heavy duty trucks and trailers which have multiple rear axles, torque rods are used in combination with any one of the other types of springs mentioned above to maintain the rear axles perpendicular to the vehicle center-line.

The present invention concerns itself with the inability of present day suspension systems to direct the rear axles and their associated rear drive wheels around corners in an efficient manner. On non-articulated trucks, trailers and buses having multiple rear axles ("tandem" for two, "tri-axle" for three, and so forth), the suspension system maintains the drive axles substantially perpendicular with respect to the longitudinal center-line of the vehicle along which the drive shaft lies. The associated drive wheels therefore take corners in a manner which exerts damaging forces between the drive wheels and road surface since they fail to rotate along the line of curvature of the turn. The result is drive wheels which wear out quickly and tear up road surfaces.

Other self-tracking suspensions systems require installation of all new apparatus which are complex in design and expensive to maintain, and lacking in drive stability.

It is therefore a principle object of the present invention to provide a suspension system which permits the rear axles and associated wheels on multiple rear axle vehicles to automatically track into a turn upon cornering which substantially reduces damaging forces between the rear drive wheels and road surface.

It is a further object of the present invention to provide a vehicle suspension system which increases the useful life of rear drive wheels on multiple rear axle vehicles.

It is another object of the present invention to provide a suspension system of the above type which can be easily incorporated into existing vehicle suspension systems with only slight modifications being made to the springs and/or torque rods thereof.

Other objects will in part be obvious and in part appear hereinafter.

SUMMARY OF THE INVENTION

In accordance with the foregoing objects, the invention comprises a suspension system for vehicles having more than one rear axle which are typically found on heavy trucks, trailers and buses of the non-articulated type. The suspension system of the invention creates full-floating, self-tracking rear axles not heretofore available on such vehicles. The term "full-floating" refers to the rear axle pivoting with respect to the longitudinal center-line of the vehicle body about an axis normal to the road surface when cornering. The pivot point on rear drive axles is a universal joint connection between the drive shaft and the differential which is known in the art, however; the universal joint in prior art vehicles is provided to prevent the drive shaft from breaking away from the differential when under stress, and not to allow the rear axle to pivot any substantial distance as does the present suspension system. Rear trailer axles which do not connect to the drive shaft may also pivot at the longitudinal center-line of the vehicle about the suspension connections to the vehicle chassis as modified per the present invention.

The term "self-tracking" refers to the rear drive wheels automatically aligning to rotate along the line of curvature of the turn when cornering the vehicle instead of remaining substantially parallel to the longitudinal center-line of the vehicle body as the wheels do in most prior systems which inflicts damaging forces to both wheel and road.

As aforementioned, the springs of the suspension system provide, among other things, the function of locating the rear axle. Torque rods are used to maintain the perpendicular orientation of the axle with respect to the center-line of the vehicle. Rubber bushings are used at their ends to permit very limited angular movement as the vehicle turns. Multiple rear axle vehicles mount torque rods parallel to the longitudinal center-line of the vehicle body. Such parallel positioning of the torque rods with respect to the vehicle longitudinal center-line biases the rear axle(s) in a position substantially perpendicular to the vehicle center-line. Hendrickson suspensions use equalizer bars in combination with leaf springs, the equalizer bar extending from one rear axle to the other to maintain the respective, parallel positions of each.

The present invention modifies existing suspension systems of the above type by angling the forward ends of the torque rods (or equalizer bars) inwardly towards the vehicle center-line and/or modifying the spring mounts to allow limited yet enhanced lateral movement of the springs. Such angling of the torque rods and modifying of the spring mounts react to the forces imparted thereon throughout a turn of the vehicle by allowing the associated rear axles to automatically pivot about the vehicle center-line, directing the rear wheels to "track" or rotate along the line of curvature of the turn. This reduces the damaging forces inflicted to both wheel and road which normally occur on vehicles with the aforementioned prior art suspension systems. Upon completion of the turn, the suspension system returns the axles to a position substantially perpendicular to the vehicle longitudinal centerline.

BRIEF DESCRIPTION OF THE DRAWINGS

FIG. 6 is a fragmentary, simplified, bottom plan view showing placement of a first embodiment of the equalizer bars mounted between the two rear drive axles incorporating the modified Hendrickson suspension system of the present invention;

FIG. 7 is a rear, elevational view of the modified Hendrickson suspension system seen in FIG. 6;

FIG. 8A is a side, elevational view of a second embodiment modified equalizer bar;

FIG. 8B is a side, elevational view of the equalizer bar of FIG. 8A rotated 90 degrees with a first end thereof shown attached to an axle housing (broken away) in the intended manner;

FIG. 9A is a side, elevational view of a first side of a third embodiment modified equalizer bar;

FIG. 9B is a side, elevational view of the second, opposite side of the equalizer bar of FIG. 9A;

FIG. 10 is a fragmentary, simplified, bottom plan view showing placement of the third embodiment equalizer bars of FIGS. 9A and 9B between the two rear drive axles in a tandem vehicle;

FIG. 11 is a simplified, diagrammatic plan view of the rear-end half of a vehicle fitted with the modified Hendrickson suspension seen in FIG. 6. The vehicle in FIG. 11 includes three rear axles with all three axles being full-floating and self-tracking with respect to the center-line of the vehicle body in accordance with the invention;

FIG. 13A is a plan view of a Mack spring modified in accordance with the present invention;

FIG. 13B is a plan view showing one end of the modified spring seen in FIG. 13A positioned within a Mack spring hanger also modified in accordance with the present invention;

FIGS. 17A-D are simplified, bottom plan views showing alternate placements of lower torque rods in accordance with the present invention; and FIG. 18 is an exploded, perspective view of a prior art Hutchens suspension.

DETAILED DESCRIPTION

The present invention provides a rear suspension system for trucks, trailers and buses of the non-articulated type and which have multiple rear axles, the novel suspension system of the invention allowing the rear axles to automatically track around corners. Specifically, "tracking" refers to the pivoting motion of the rear axles about the longitudinal center-line of the vehicle along an axis normal to the road surface whereby the associated wheels follow the line of curvature of a turn. Present day suspension systems do not permit such tracking of the rear wheels which subjects them to excessive side forces when cornering which damages the wheels and tends to tear up road surfaces. Tracking of the rear axles and wheels is not required on articulated vehicles due to pivoting of the forward with respect to the back portion of the vehicle; hence, the present invention applies solely to non-articulated vehicles.

The present invention may be incorporated into suspension systems presently existing on most types of non-articulated trucks, trailers and buses by making generally simple modifications thereto. The ensuing description will therefore cover different embodiments of the invention as applied to the different types of suspension systems in use today.

Figure 1:
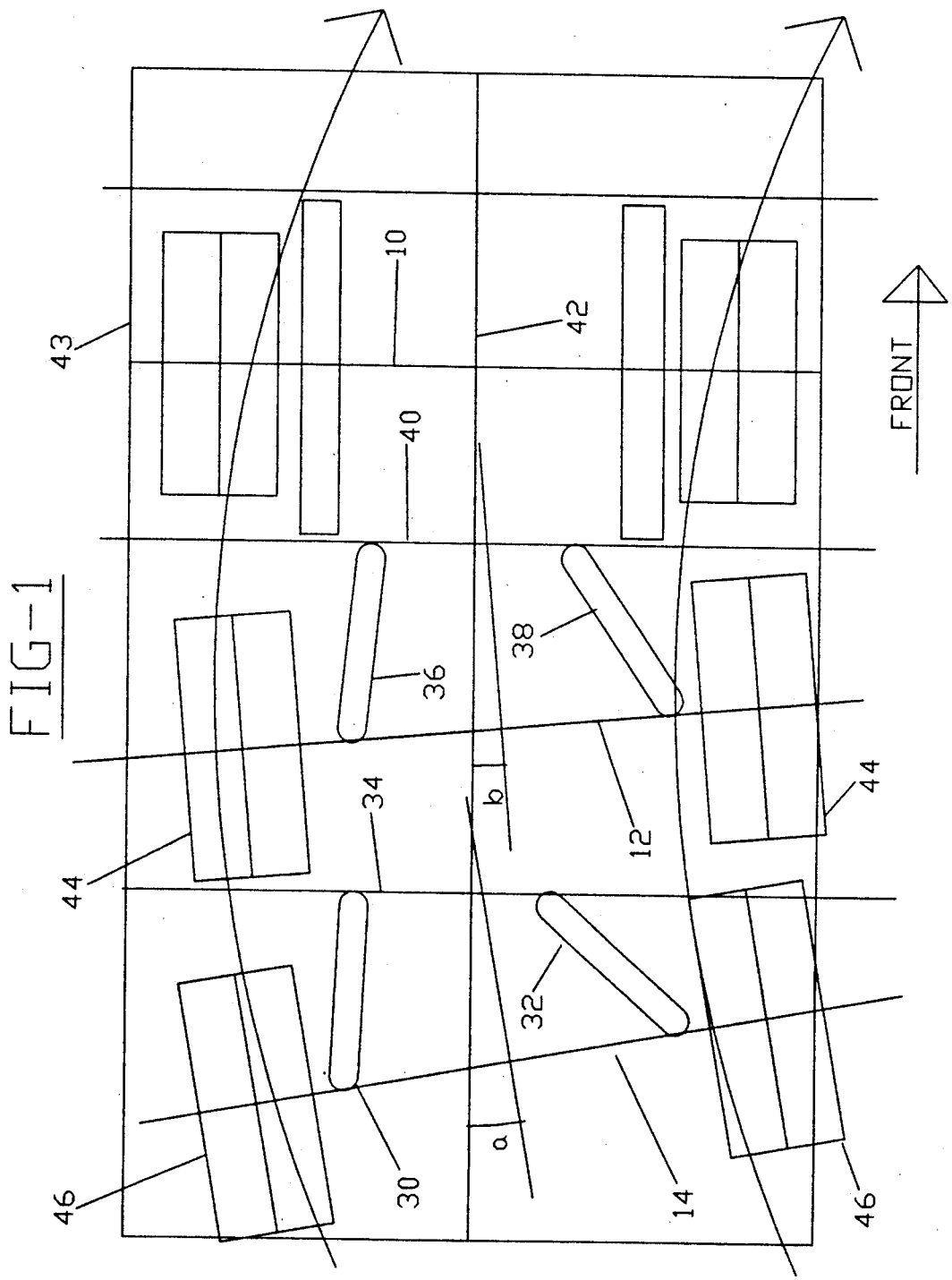
FIG. 1 is a simplified, diagrammatic plan view of the rear-end half of a vehicle having three rear axles with the back two rear axles being full-floating and self-tracking in accordance with the invention with respect to the center-line of the vehicle body. The axles of FIGS. 1-3 are shown in the positions they automatically assume through a right-hand turn of the vehicle.
Figure 2:
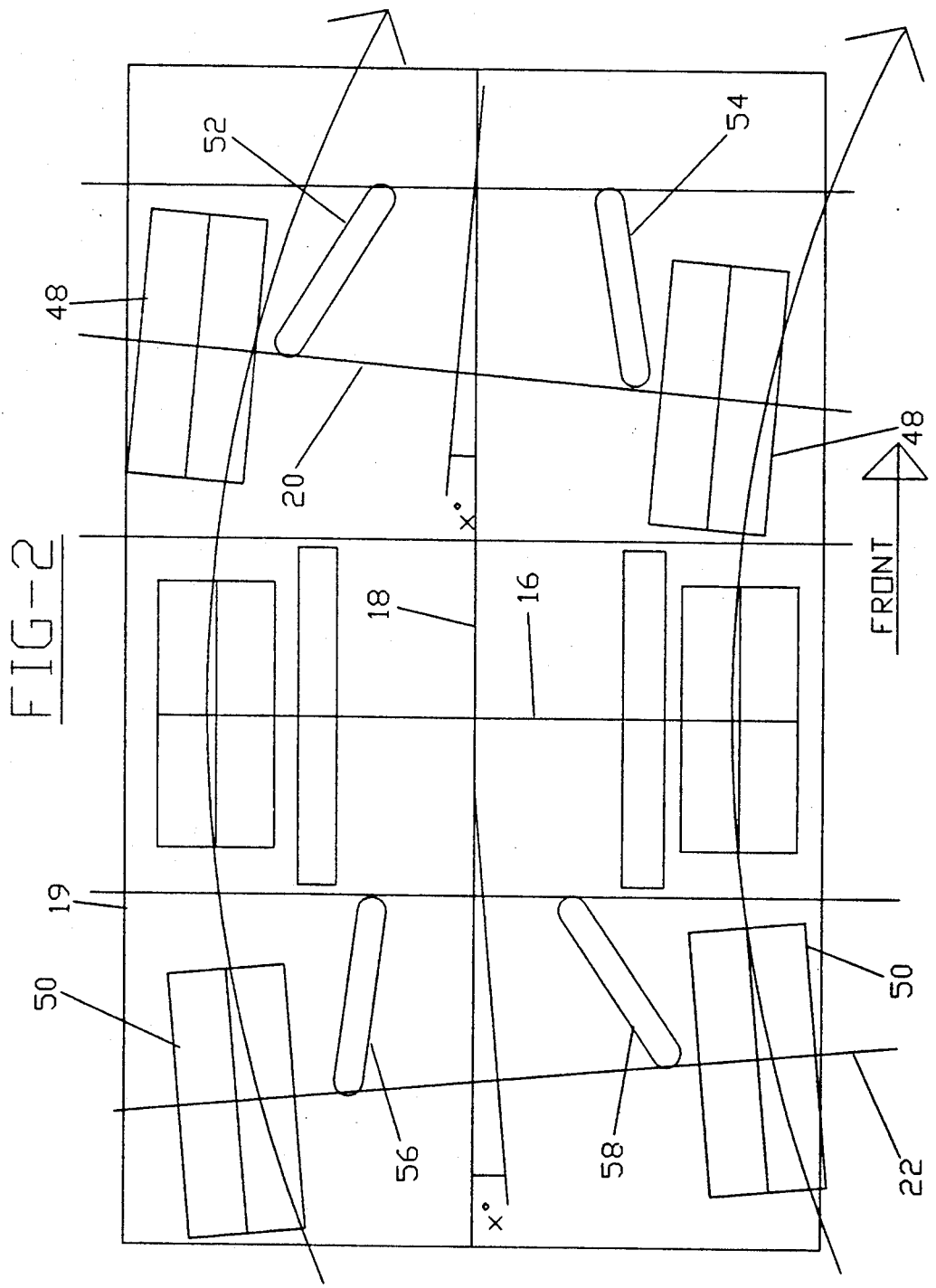
FIG. 2 is a simplified, diagrammatic plan view of the rear-end half of a vehicle having three rear axles with only the front and back rear axles being full-floating and self-tracking in accordance with the invention with respect to the center-line of the vehicle body.
Figure 3:
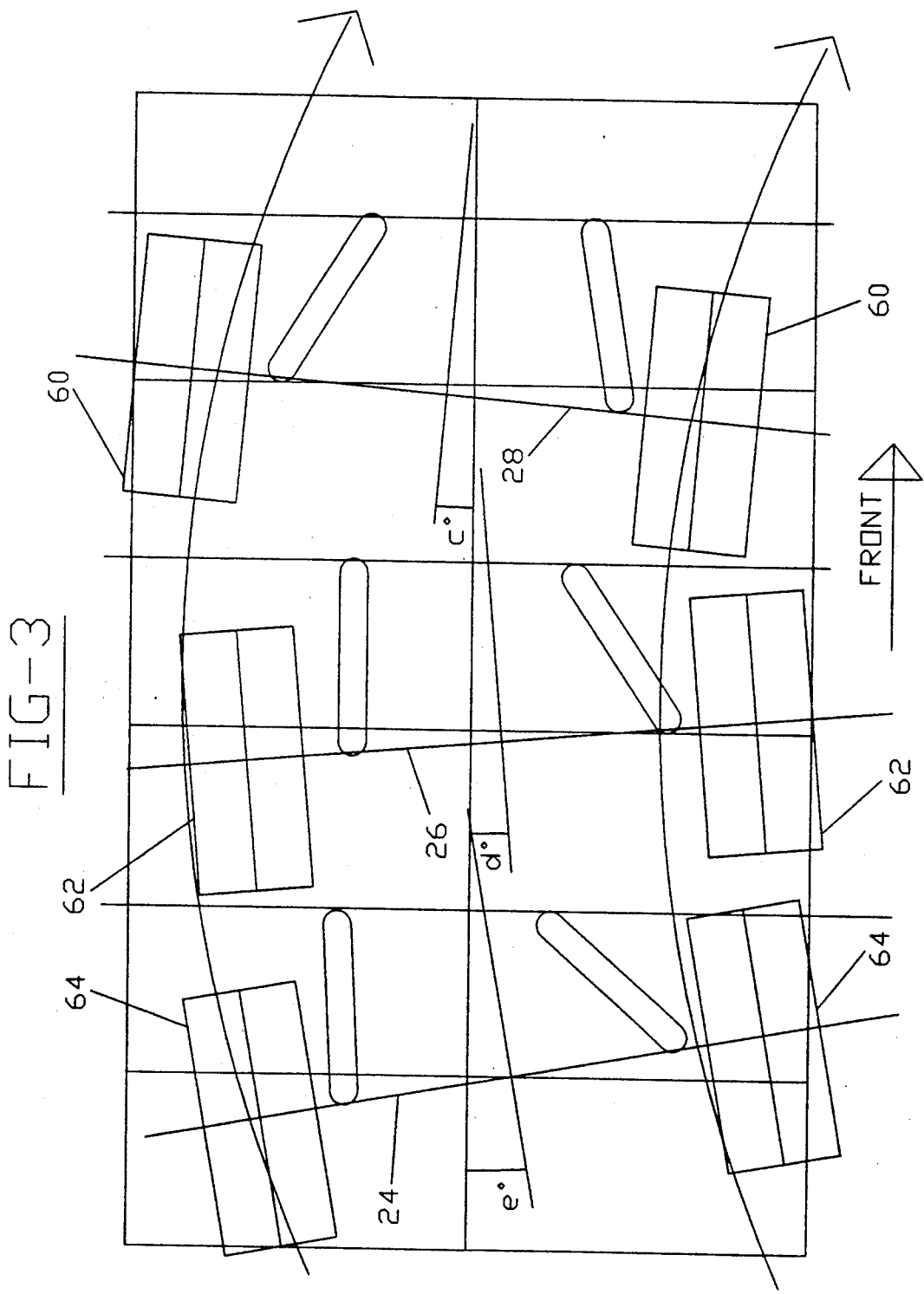
FIG. 3 is a simplified, diagrammatic plan view of the rear-end half of a vehicle having three rear axles with all three axles being full-floating and self-tracking in accordance with the invention with respect to the center-line of the vehicle body.

To illustrate the "tracking" movement achieved by the present invention, attention is turned to FIGS. 1, 2 and 3 which show the invention incorporated into three different typical tri-axle rear-ends having lower torque rods which are found on many heavy-duty trucks of today, the front steering axles not being shown. Since the purpose of FIGS. 1-3 is to illustrate the tracking movement of the axles, all parts are shown extremely simplified. In FIG. 1, forward rear axle 10 is a non-rotating, add-on axle and not equipped to self-track in accordance with the invention as are the middle and rear axles 12 and 14, respectively. A third add-on axle is typically required on heavy-duty vehicles carrying loads above a regulated weight. The arrangement of FIG. 1 is especially suited for long wheel-base vehicles which refers to the distance between the forward and rear wheels.

In FIG. 2, the middle rear axle 16 is a non-rotating, add-on axle which is also non-pivoting or "non-self-tracking" with respect to the center-line 18 of vehicle body 19 along which the drive shaft of the vehicle would lie. On the other hand, forward and rear axles 20 and 22 are made to self-track in accordance with the invention, this arrangement being suited for medium wheel-base vehicles.

Lastly, FIG. 3 shows a rear-end with three self-tracking rear axles 24, 26 and 28, this arrangement being especially suited for vehicles with short wheel-bases.

In each of the FIGS. 1-3, the axles, wheels and torque rods are shown in their "cornering position" which is the position they automatically assume during the illustrated right-hand turn, the right-hand turn being chosen as an example to show the self-tracking movement of the axles. In FIG. 1, it is seen that rear axle 14 includes torque rods 30 and 32 which anchor to axle 14 at first ends thereof and to lateral support bar 34 at second, opposite ends thereof. Torque rods 30 and 32 actually anchor to the housing in which axle 14 rotates. It is to be inferred throughout the present application that all axles are encased within axle housings. Middle axle 12 includes torque rods 36 and 38 which attach to axle 12 and lateral support bar 40 at first and second ends thereof, respectively During a right-hand turn of a vehicle having the rear-end of FIG. 1, forward axle 10 remains substantially perpendicular to the center-line 42 throughout the turn while axles 12 and 14 automatically pivot about center-line 42 of vehicle body 43 by an amount of "b" and "a" degrees, respectively, as shown about an axis normal to the road surface where angle a is larger than angle b due to the radius of curvature of the turn being greater at axle 14. The associated pairs of wheels 44 and 46 are thereby aligned to rotate along the line of curvature of the turn represented by the directional arrows.

As briefly explained previously, the positioning of the forward ends of the torque rods 30, 32 and 36, 38 which anchor to lateral support bars 34 and 40, respectively, inwardly toward the center-line 42, cause axles 12 and 14 and associated wheels 44 and 46 to automatically track into the line of curvature of the turn as shown. The torque rods are thus also shown in cornering position in FIGS. 1–3.

During a right-hand turn with a stationary axle 16 in the middle of the tri-axle rear-end of FIG. 2, the forward axle 20 pivots in a clock-wise direction about center-line 18 of vehicle body 19 $\times$ degrees while the rear axle 22 pivots in a counter-clockwise direction an equal amount of degrees x since the radius of curvature of the turn is the same at axles 20 and 22 but directed along different tangents. Associated wheels 48 and 50, respectively, are thereby aligned to rotate along the line of curvature of the turn represented by the directional arrow. Torque rods 52, 54 and 56, 58 of axles 20 and 22, respectively, are also shown in torsion position.

Lastly, during a right-hand turn with the three floating rear axles of FIG. 3, the forward axle 28 automatically pivots clockwise c degrees while middle and rear axle 26 and 24, respectively, pivot counter-clockwise d and e degrees, respectively, where angle e is larger than angle d and angle c equals angle d. Associated wheels 60, 62 and 64, respectively, are likewise thereby aligned to rotate along the line of curvature of the turn represented by the directional arrow.

While three different tri-axle rear-ends have been shown to briefly illustrate automatic "self-tracking" achieved by the present invention, it will be understood that the present invention may be incorporated into virtually any type of rear-end combination existing today. However, the ensuing description will relate mainly to tandem vehicles (two rear axles) for purposes of clarity of description.

Figure 4:
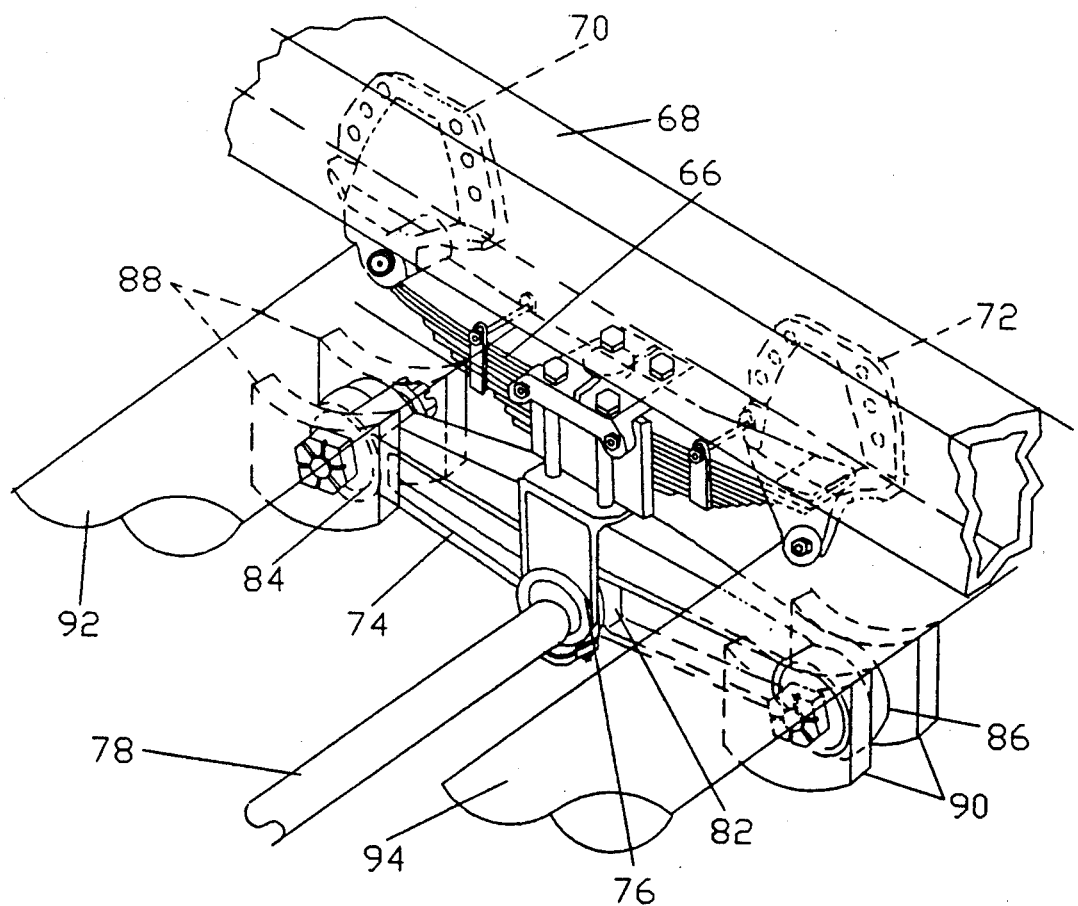
FIG. 4 is a perspective, fragmentary side view of a prior art Hendrickson suspension system.
Figure 5:
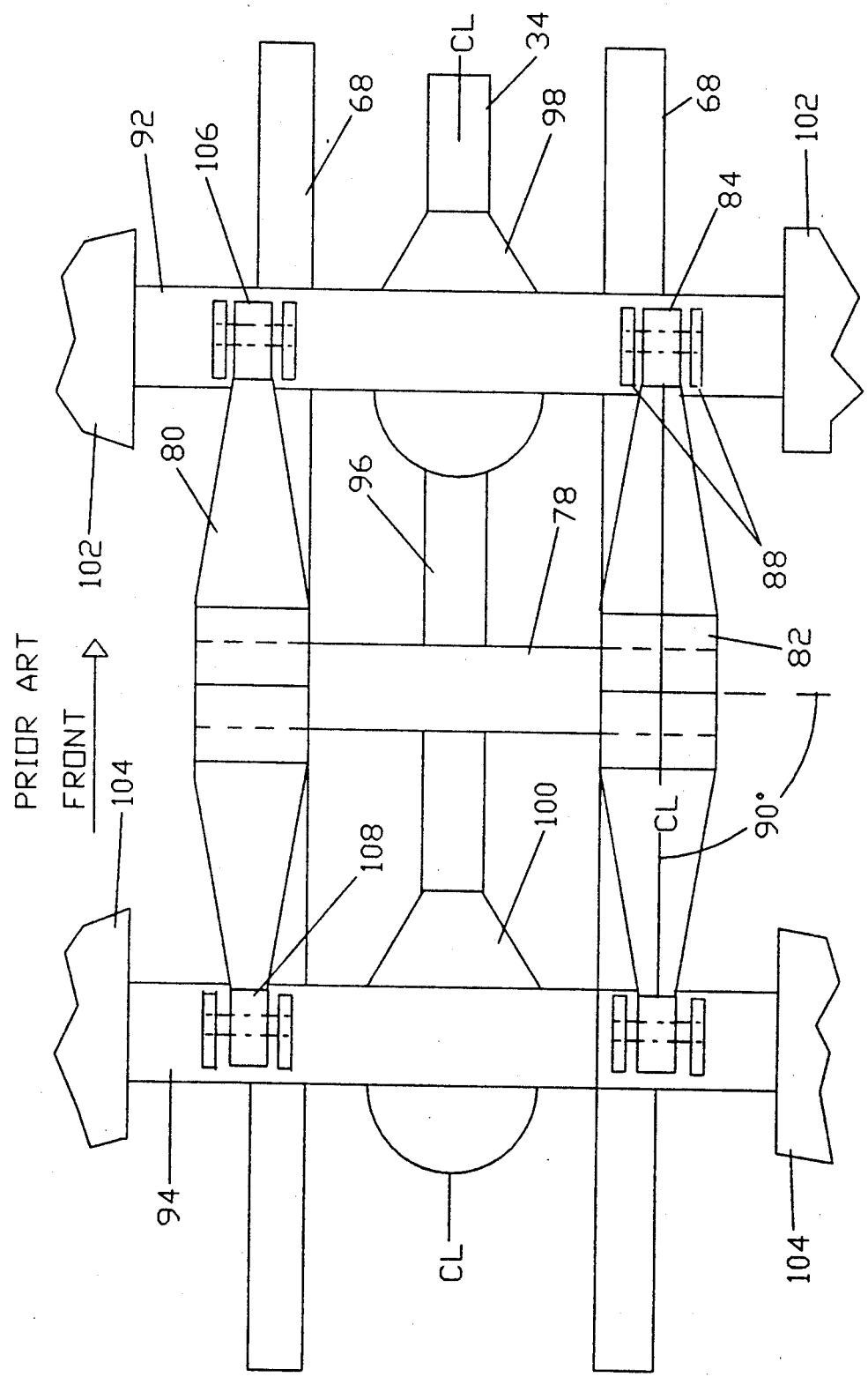
FIG. 5 is a fragmentary, simplified, bottom plan view showing placement of the equalizer bars between the two rear drive axles in a tandem vehicle incorporating the prior art Hendrickson suspension system of FIG. 4.

A first embodiment of the invention applies to Hendrickson suspension systems and attention is turned to FIGS. 4 and 5 which illustrate a representative, prior art Hendrickson suspension system identified by RT 500 series. As a note to the reader, it is understood that the right and left sides of the vehicle suspension system are identical even though only a single side is sometimes discussed for the sake of clarity hereinafter. The Hendrickson 500 series suspension system generally comprises a set of leaf springs 66 which include opposite ends retained in side-mounted spring hangers 70 and 72. An equalizer bar 74 and spring 66 attach at their centers via a center spring hanger 76. Center hanger 76 also anchors to a stabilizer shaft 78 which extends laterally of the vehicle to interconnect equalizer bar 74 to equalizer bar 80 on the other side of the vehicle (FIG. 5).

Equalizer bar 74 includes three bore holes extending laterally therethrough at the middle 82 and forward and rear ends 84 and 86 thereof, respectively. Each bore hole is fitted with a bushing which connects middle portion 82 to center hanger 76 on stabilizer bar 78; and forward and rear ends 84 and 86 to hangers 88 and 90 on the underside of the front and rear axle housings 92 and 94, respectively.

The springs 66 and equalizer bar 74 of the Hendrickson 500 series suspension are seen to be mounted in longitudinal alignment with each other and the frame 68 in the prior art assemblies of FIGS. 4 and 5 with the center-line of the vehicle being defined by the drive shaft 96. Differentials 98 and 100 transmit torque from drive shaft 96 to front and rear drive axles within housings 92 and 94 to rotate front and rear drive wheels 102 and 104, respectively. (The front steering axle and steering wheels are not shown in the drawings.) This arrangement locates the rear drive axles/housings 92 and 94 in a position substantially perpendicular to the center-line CL of the vehicle while also providing the cushioning and damping required between the vehicle body and wheels. The first embodiment of the invention modifies the Hendrickson 500 series suspension as follows to create full-floating, self-tracking rear axles as those terms were previously defined above.

Attention is turned to FIGS. 6 and 7 which show the modified Hendrickson suspension which constitutes the first embodiment of the invention. As seen, equalizer bars 74' and 80' are mounted at an angle with respect to the center-line of the vehicle with their forward ends 84' and 106' moved toward each other on axle housing 92 and rear ends 86' and 108' moved away from each other on rear axle housing 94, respectively. Specifically, it is seen that the rear ends 86' and 108' of equalizer bars 74' and 80' are mounted to the underside of rear drive axle housing 94 via hangers 90 and 110, respectively, at a location adjacent their associated rear drive wheels 104 rather than the ends 86' and 108' being mounted directly beneath springs 66 as in the prior art Hendrickson 500 series seen in FIGS. 4 and 5 (left side spring 66 seen in FIG. 7). The forward ends 84' and 106' are mounted to the underside of forward drive axle housing 92 via hangers 88 and 112, respectively, inwardly toward the center-line CL adjacent differential 98.

In addition to mounting the equalizer bars at an angle in the manner described, the equalizer bars must be either constructed differently than the prior art equalizer bars and/or be fitted with special bushings as follows.

Three different embodiments of equalizer bars are provided by the present invention depending on the load-carrying capacity of the vehicle and manner of vehicle use. Equalizer bar 74' (which is identical to bar 80' except for being flipped over when mounted to the vehicle as shown and described) includes a bore hole at center 82' drilled at an obtuse angle f rather than being drilled at a 90° angle with respect to the longitudinal axis of the equalizer bar as is center bore hole 82 in prior art equalizer bar 74. Ends 84' and 86' are also angled with respect to the longitudinal axis of bar 74' whereby the bore holes in ends 84' and 86' and center portion 82' all lie parallel to each other. Each bore hole is further fitted with a ball and socket bushing equivalent to the Euclid E-2031 seen on page 168 of Euclid #303B Heavy Duty Trucks, Tractors & Trailer Parts Catalog. Also, the bushing at center portion 82' should be approximately twice as large as the bushings at ends 84' and 86' since the center 82' of bar 74' takes the brunt of the weight of the vehicle.

Equalizer bars 74' and 80' are configured for medium-duty vehicles. For light-duty and heavy-duty vehicles, attention is turned to FIGS. 8A & B and 9A & B which show preferred equalizer bar configurations for light-duty and heavy-duty vehicles, respectively. Referring first to FIGS. 8A and 8B, the only difference between equalizer bar 114 and equalizer bar 74' is that the ends 116 and 118 extend linearly from the remainder of bar 114 instead of being angled with respect thereto as are the ends of bar 74' as described previously. If this design of equalizer bar 114 is used as is intended for light-duty vehicles, then the hangers 120 attaching the equalizer bar ends to the axle housings (only end 116 is shown attached to housing 92) must be mounted at an angle g which is less than the 90° angle the hangers lie which attach bars 74' and 80' to axle housing 92 and 94. The same type of ball and socket bushing used in bars 74' and 80' are used in bar 114.

For heavy-duty vehicles such as garbage and cement trucks, attention is turned to FIGS. 9A, B and 10 which show a third, heavy-duty configuration of equalizer bar referenced generally by numeral 120. Equalizer bar 120 is seen to comprise an equalizer bar configured like bar 74' except for further comprising a second forward prong 122 which forms a "y" with forward prong 124. This "y" configuration provides added suspension stability as both the right and left equalizer bars 120 bear a substantial amount of the load carried by heavy-duty vehicles.

Second forward prong 122 is seen in FIGS. 9A and B to comprise forks 126 and 128 forming a slot 130 therebetween. Forks 126 and 128 fit about a sliding bearing 132 mounted to hangers 134 on axle housing 92 adjacent wheels 102. As such, prongs 122 of right and left bars 120 may move laterally between the two ends of right and left hangers 134 as the vehicle makes a turn.

To illustrate the "tracking" movement of a vehicle having the modified Hendrickson suspension system of the invention as seen in FIG. 6 and 7, attention is turned to FIG. 11. Axle 136 is an add-on tri-axle and includes torque rods 138 and 139 with the forward ends thereof oriented toward the center-line CL of the vehicle body 140 making axle 136 self-tracking. The forward ends of torque rods 138 and 139 mount to a lateral support bar 142 which connects to and extends between each side of the vehicle frame (not shown). As seen, through a right-hand turn of the vehicle represented by the directional arrows, forward axle 136 and middle axle 92 both pivot clockwise along the radius of curvature of the turn while rear axle 94 pivots counter-clockwise which directs the drive wheels 101, 102 and 104 to rotate along the curvature of the turn. Torque rods 138 and 139 and equalizer bars 80' and 74' are also shown in torsion position.

Figure 12:
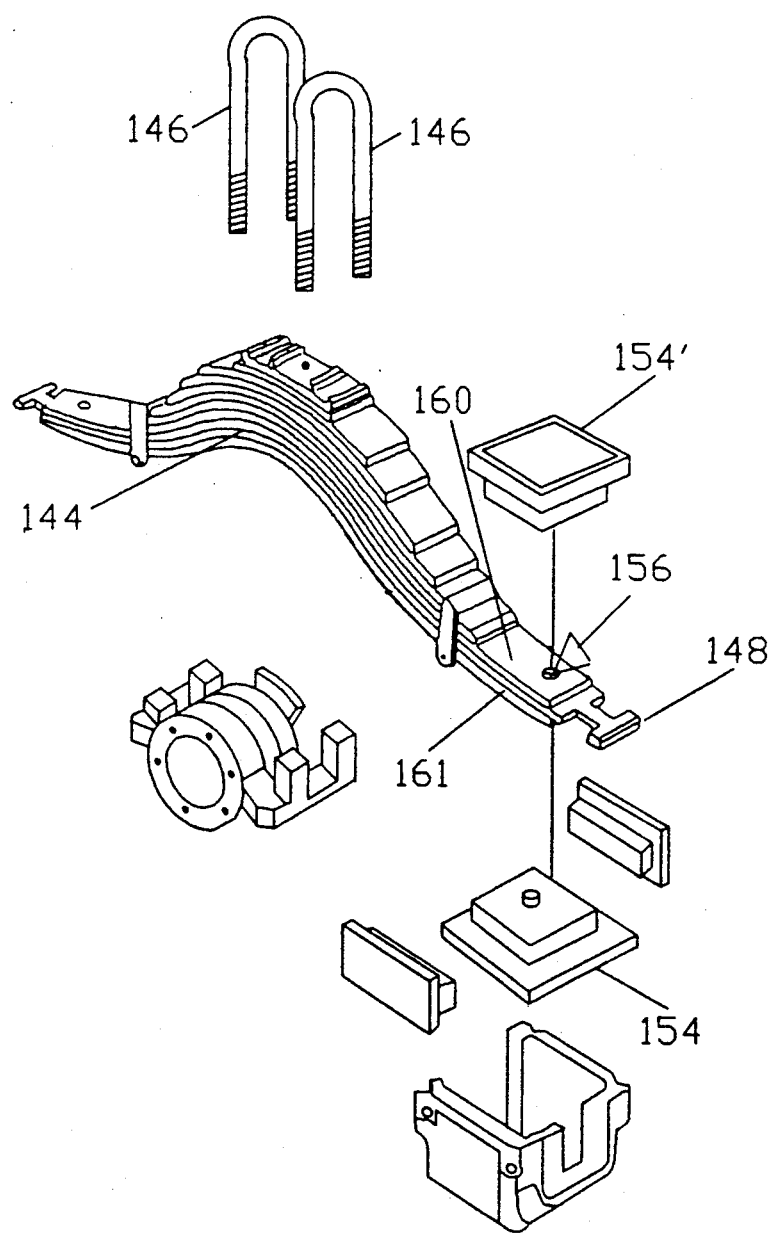
FIG. 12 is an exploded, perspective view of a prior art Mack suspension system.

Having described the modifications necessary to make a Hendrickson suspension system self-tracking in accordance with the invention, discussion is now turned to the Mack suspension system, examples of which may be seen on pages 190 and 192 of the above-referenced catalog and FIG. 12. In FIG. 12, a set of semi-elliptical leaf springs 144 are mounted to a vehicle frame via center spring hangers 146. Spring 144 includes T-shaped ends 148 which extend through a slot 150 in a respective hanger 152 which attaches to spring 144 via retaining elements 154 154' extending through aperture 156. Top retaining element 154' interconnects with bottom retaining element 154 through aperture 156 with retaining elements 154, 154' and spring end 148* positioned within hanger 152. Hanger 152 mounts a first end of spring 144 to a rear axle housing and a second hanger 152 (not shown) mounts the second, opposite end of spring 144 to a lateral support bar (not shown) extending between and parallel to the rear axles of the vehicle.

Attention is turned to FIGS. 13A and B which show a Mack spring 158 modified in accordance with the present invention. Modified spring 158 is intended to replace spring 161 seen in FIG. 12 and may be either semi-elliptical or planar in configuration depending on the shape of the prior art springs into which spring 158 is incorporated. In this regard, it is noted that prior art Mack suspension springs are available in both the semi-elliptical and planar configurations.

Spring 158 comprises an elongated middle portion 164 with opposite ends 166 and 168 configured to allow angular motion of spring 158 with respect to the longitudinal axis thereof during a turn of the vehicle in which it is used in the intended manner. Specifically, end 168 is of generally rectangular configuration and includes a finger portion 170 extending at an approximately 45° angle with respect to the longitudinal axis X—X of spring 158, portion 170 extending from the terminal edge of end 168 opposite the edge integrally connected to middle portion 164.

Finger 170 includes opposite, parallel edges 172 and 174 with edge 174 forming a notch 176 with the rectangular portion of end 168. As seen in FIG. 13B, end 168 is positioned within a hanger 178 which is identical to prior art hanger 152 except for the edges 180 and 182 being angled to lie spaced and parallel to finger edges 172 and 174 of spring 158 when spring end 168 is positioned within hanger 178 as shown. An elongated aperture 184 extending through the center of end 168 also lies parallel to finger edges 172 and 174 and wherethrough the bushing set 154 and 154' of FIG. 12 extends when positioned within hanger 178 in the usual manner of prior art Mack spring installation.

It will be noticed that the end 166 of spring 158 opposite end 168 is identical in configuration to end 168 except that finger portion 186 extends in the opposite direction as finger 170. As such, fingers 170 and 186, and elongated apertures 184 and 188 all extend spaced and parallel to each other. End 166 is likewise positioned within a hanger 178 (not shown) whereby spring 158 may move within the hangers along axis y—y at apertures 184 and 188.

Figure 14:
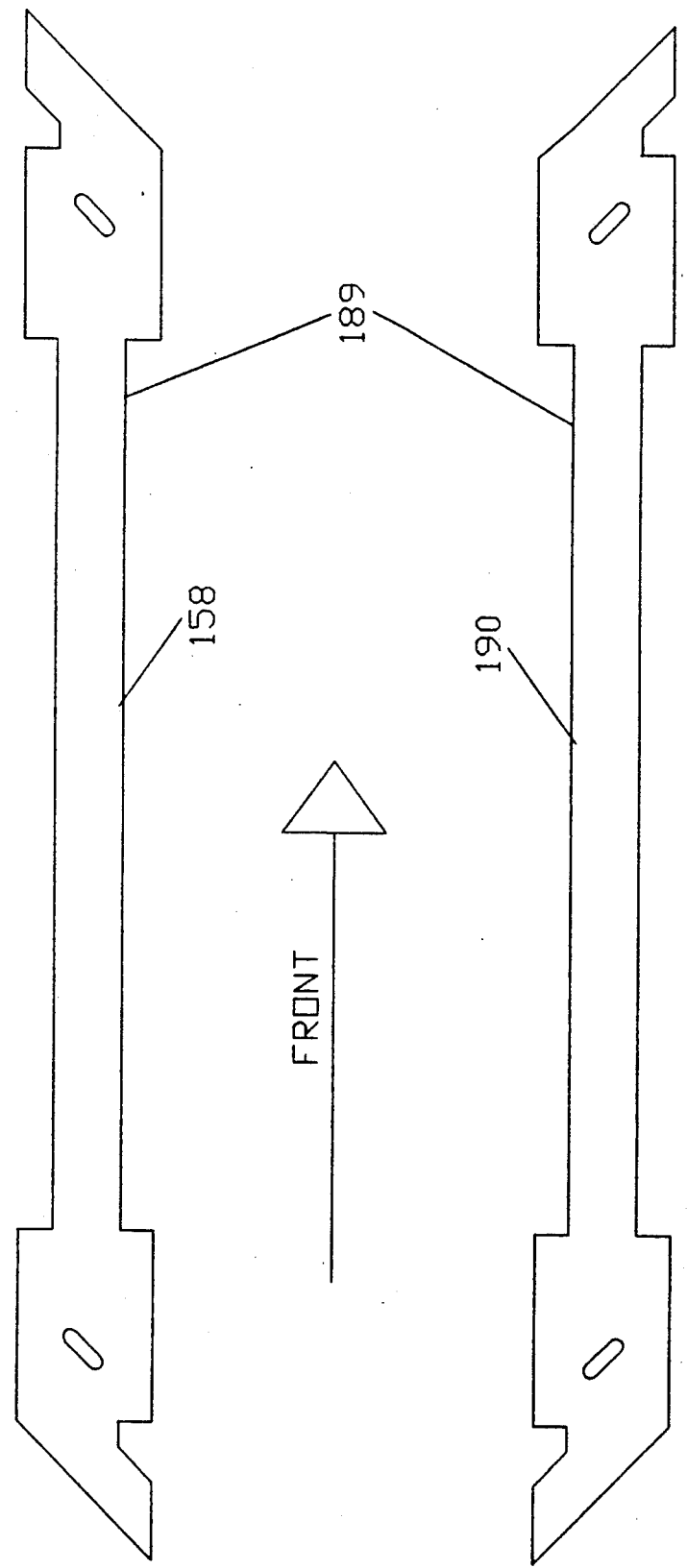
FIG. 14 is a simplified plan view of two of the modified Mack springs seen in FIG. 13A showing the proper orientation of the springs within a vehicle.

The orientation of hangers 178 and spring finger portions 170 and 186 when installed within a vehicle is seen generally in FIG. 14 where spring 158 extends along the left side of the vehicle body 189 and spring 190 extends along the right side thereof. The installation position of springs 158 and 190 with respect to the vehicle frame is the same as in prior art Mack suspension systems.

Figure 15:
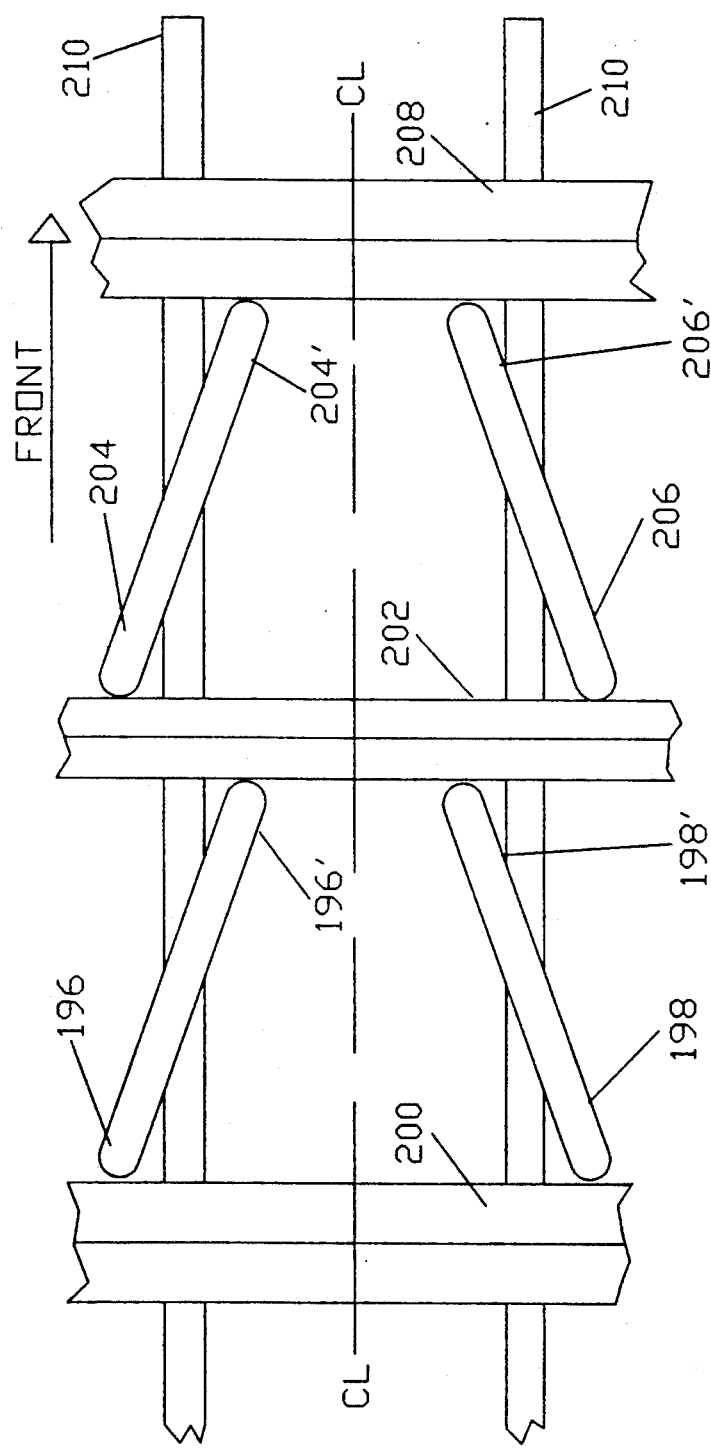
FIG. 15 is a simplified bottom plan view showing placement of the lower torque rods in a Mack suspension modified in accordance with the present invention.

Referring to FIG. 15, a first set of torque rods 196 and 198 in the modified Mack suspension system of the invention extend from the rear drive axle 200 to a lateral stabilizer bar 202, and a second set of torque rods 204 and 206 extend from the lateral stabilizer bar 202 to the front drive axle 208. As in all embodiments of the invention, the forward ends 196', 198', and 204', 206' of lower torque rods 196, 198, and 204, 206, respectively, are angled toward the center-line CL of the vehicle body. It is noted that prior art Mack suspension systems do not have lower torque rods due to the T-shaped ends of springs 144 acting to maintain restoring force. In this respect, it is noted that the installer/user of the present invention has three choices when modifying Mach suspensions in accordance with the invention. The suspension will self-track with the spring arrangement of FIGS. 13a and b alone, with the torque rods of FIG. 15 in combination with the prior springs of FIG. 12, or with the combination of the modified springs of FIGS. 13a and b and the torque rods of FIG. 15.

Figure 16:
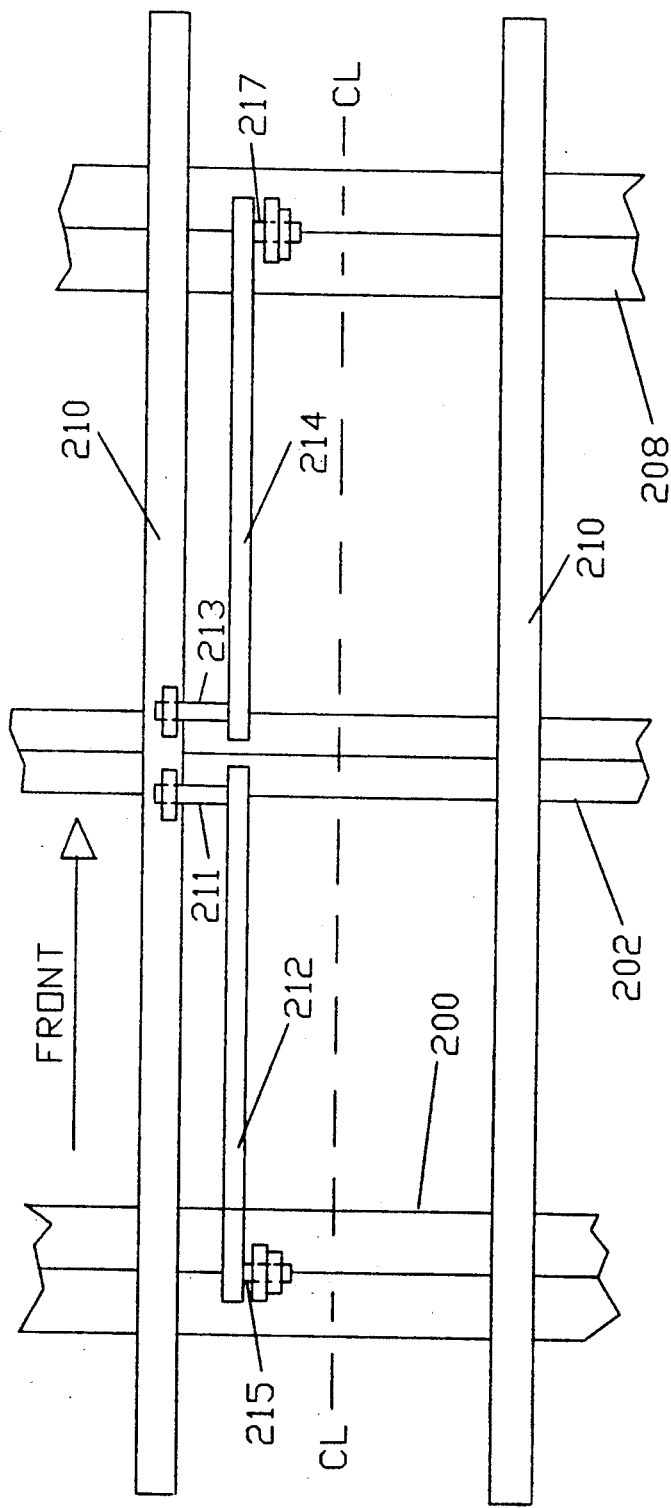
FIG. 16 is a simplified top plan view showing placement of the upper torque rods in the Mack suspension.

In FIG. 16, it is seen that prior art Mack suspension systems include two upper torque rods 212 and 214 which connect to the top of rear drive axle 200 to frame 210 adjacent lateral support bar 202, and frame 210 (adjacent lateral support bar 202) to forward drive axle 208, respectively. All bushings on the torque rods are of the type which permit movement of the bars when self-tracking, such as part no. 832580 manufactured by Clevite Industries Inc. (Elastomer Products Division). Torque rods 212 and 214, although not required to be angled with respect to the center-line CL of the vehicle as are lower torque rods 196, 198 and 204, 206, need to be moved an inch or two laterally toward the center-line CL to permit proper clearance between the torque rod and frame 210 during self-tracking. This is true for all suspension systems having one or more upper torque rods similar to the prior art Mack suspensions. This is accomplished by lengthening ends 211 and 213 and moving hangers 215 and 217 on bars 212 and 214, respectively, toward the vehicle center-line.

The above has described the invention with particular reference to two particular embodiments thereof, a modified Hendrickson suspension system and a modified Mack suspension system. This is due to the specialized configuration of the Hendrickson equalizer bar and the Mack springs requiring specialized modifications thereto in accordance with the invention. These "specialized modifications" include the specialized Hendrickson equalizer bars seen in FIG. 6, 7 8A and B, 9A and B, and 10; and the specialized Mack springs seen in FIGS. 13A and B and 14.

The remaining suspension systems known in the art are different from each other only in minor respects and require two basic changes to become self-tracking in accordance with the invention which are:

1) positioning the lower torque rods with their forward ends extending inwardly toward the longitudinal center-line of the vehicle; and 2) widening the spring attachments (i.e., the spring hangers) to permit enhanced lateral movement of the springs during cornering.

For example, attention is turned to FIGS. 17A-D which show four possible placements of lower torque rods in suspension systems having under-frame spring hanger mounts. In FIG. 17A, both sets of torque rods 220, 222 and 224, 226 extend behind their respective axles 228 and 230. In FIG. 17B, both sets of torque rods 232, 234 and 236, 238 extend forwardly of their respective axles 240 and 242 to which they mount. In FIG. 17C, (which is essentially the same as FIG. 15) the rear set of torque rods 196, 198 extend forwardly of axle 200 to which they attach, and the forward set of torque rods 204, 206 extend rearwardly of axle 208 to which they attach. Finally, in FIG. 17D, rear set of torque rods 256, 258 extend rearwardly of axle 260 to which they attach, and torque rods 262, 264 extend forwardly of axle 266 to which they attach.

Thus, no matter where the original position of torque rods are on prior art suspensions with respect to their associated rear axles, self-tracking of the invention involves positioning all forward ends thereof (the ends pointing toward the front of the vehicle referenced by the arrow) inwardly toward the vehicle center-line.

Also, since the tracking movement involves pivoting of the rear axles, the springs must also be allowed to move laterally which is accomplished in multi-leaf spring under-frame and side-frame mount designs by enlarging or widening their attachments such as hangers 268 seen in FIG. 18 which is a typical under-frame mount spring hanger. In some prior art suspension designs, such as in the prior art Hutchens of FIG. 18, lengthening of the springs may also be necessary. Also some suspensions have pneumatic shock-absorbers (airbags) instead of leaf springs and do not require modification since they are designed to accept lateral deflection.

Furthermore, all bushings connecting torque rods (upper and lower) to the suspension and axles must be of the type permitting the side forces incurred during the self-tracking movement. As mentioned above, ball and socket bushings equivalent to the Euclid E-2031 are preferred on Hendrickson suspensions modified in accordance with the invention, and bushings having specifications equal to Clevite bushing no. 832580 are preferred for all others.

Vehicles having suspensions modified for self-tracking as described above also operate in reverse but may be found difficult for all but the truly experienced driver of tandem vehicles. For this reason, power controls may need to be incorporated for movement of the rear axles as required for proper alignment of the axles when backing. These controls would be located in the cab of the vehicle for access by the driver and be operable to automatically pivot each of the rear tracking axles when the vehicle transmission reverse drive is engaged.

The invention has been described with particular reference to preferred embodiments thereof. It will be appreciated to those skilled in the art that various changes may be made to fit particular applications which are within the spirit and scope of the invention as defined by the claims which follow.

What is claimed is:

1. Suspension apparatus in a non-articulated vehicle having first and second rear axles positioned and rotatable within respective first and second rear axle housings, said vehicle having a longitudinal center-line and further including a frame having first and second elongated members extending spaced and parallel on either side of said center-line, said suspension apparatus comprising:

a.) shock absorbing means connected to and between said frame and said first and second rear axle housings;

b.) four torque rods each having forward and back ends, a first pair of said torque rods connected to and between said frame and said first rear axle housing with said back ends of said first pair of torque rods positioned adjacent said first and second, elongated members, respectively, and said forward ends of said first pair of torque rods extending therefrom in a direction laterally inwardly toward each other and said center-line, said back ends of a second pair of said torque rods positioned to and between said frame and said second rear axle housing with said back ends of said second pair of torque rods positioned adjacent said first and second elongated members, respectively, said forward ends of said second pair of said torque rods extending therefrom in a direction laterally inwardly toward each other and said center-line, said forward ends of said first and second pairs of torque rods spaced laterally of each other a distance establishing separate reaction force points at each of said forward ends, said reaction force points operable to cause automatic self-tracking of said first and second axles upon turning of said vehicle; and c) means providing lateral movement of said shock-absorbing means with respect to said longitudinal center-line upon said automatic self-tracking of said vehicle.

2. The invention according to claim 1 wherein said vehicle further comprises first and second support members extending laterally between and connected to said first and second elongated members, one of said forward and back ends of said first pair of torque rods mounted to said first axle housing and the other of said one of said forward and back ends of said first pair of torque rods mounted to said first support member, and one of said forward and back ends of said second pair of torque rods mounted to said second axle housing and the other of said one of said forward and back ends of said second pair of torque rods mounted to said second support member.

3. The invention according to claim 2 wherein said vehicle further includes a third rear axle positioned and rotatable within a third rear axle housing.

4. The invention according to claim 3 wherein said third rear axle is mounted to said frame and remains substantially perpendicular to said vehicle center-line upon turning of said vehicle.

5. The invention according to claim 4 wherein said third rear axle is positioned forwardly of said first and second rear axles.

6. The invention according to claim 4 wherein said third rear axle is positioned between said first and second rear axles.

7. The invention according to claim 3 and further comprising fifth and sixth torque rods connected to and between said frame and said third rear axle housing with said back ends of said fifth and sixth torque rods positioned adjacent said first and second elongated members, respectively, and said forward ends of said fifth and sixth torque rods extending therefrom in a direction toward each other and said center-line, said forward ends of said fifth and sixth torque rods spaced laterally of each other a distance establishing a separate reaction force at each of said forward ends of said fifth and sixth torque rods.

8. The invention according to claim wherein said shock-absorbing means comprises an elongated leaf spring having first and second ends each including a respective, integral finger portion extending in opposite, parallel directions to each other at substantially forty-five degree angles to the longitudinal axis of said spring, each of said first and second ends further including an elongated slot extending spaced and parallel to said respective finger portion, and further comprising first and second spring retaining elements anchoring said first and second ends to said first and second rear axle housings through said slots, respectively, said first and second spring retaining elements configured to permit angular movement of said first and second ends about said slots and with respect thereto along an axis parallel to said finger portions during said automatic self-tracking movement of said vehicle.

9. The invention according to claim 8 wherein said suspension apparatus further comprises fifth and sixth torque rods lying co-linear to each other and spaced and parallel to said frame, said fifth and sixth torque rods connected to and between said frame and said first and second rear axle housings above said four torque rods, said fifth and sixth torque rods each having forward and rear ends with said rear and forward end of said fifth torque rod mounted to said first rear axle housing and said frame, respectively, and said rear and forward end of said sixth torque rod mounted to said frame and said second rear axle housing, respectively, said fifth torque rod forward end and said sixth torque rod rear end mounted adjacent each other and each including a lateral extension member of predetermined length extending from said fifth torque rod forward end and said sixth torque rod rear end forming a distance between said fifth and sixth torque rods and said frame, said distance providing clearance between said fifth and sixth torque rods and said frame during said automatic self-tracking movement of said vehicle.

10. The invention according to claim 1 wherein said suspension apparatus further comprises fifth and sixth torque rods lying co-linear to each other and spaced and parallel to said frame, said fifth and sixth torque rods connected to and between said frame and said first and second rear axle housings above said four torque rods, said fifth and sixth torque rods each having forward and rear ends with said rear and forward end of said fifth torque rod mounted to said first rear axle housing and said frame, respectively, and said rear and forward end of said sixth torque rod mounted to said frame and said second rear axle housing, respectively, said fifth torque rod forward end and said sixth torque rod rear end mounted adjacent each other and each including a lateral extension member of predetermined length extending from said fifth torque rod forward end and said sixth torque rod rear end forming a distance between said fifth and sixth torque rods and said frame, said distance providing clearance between said fifth and sixth torque rods and said frame during said automatic self-tracking movement of said vehicle.

11. Suspension apparatus in a non-articulated vehicle having first and second rear axles positioned and rotatable within respective first and second rear axle housings, at least one of said first and second rear axles being driven by a drive shaft connected and extending substantially perpendicular thereto along a longitudinal center-line, said vehicle further including a frame having first and second elongated members extending spaced and parallel on either side of said drive shaft, said suspension apparatus comprising:

a.) shock absorbing means connected to and between said frame and said first and second rear axle housings;

b.) first and second equalizer bars each having forward and rear ends, said rear ends of said equalizer bars connected to said first rear axle housing adjacent said elongated frame members, said forward ends of said equalizer bars extending therefrom in a direction laterally toward each other and said center-line and connecting to said second rear axle housing, said forward ends of said equalizer bars spaced laterally of each other a distance establishing separate reaction force points at each of said forward ends, said reaction force points operable to cause automatic self-tracking of said first and second axles upon turning of said vehicle; and c) means providing lateral movement of said shock-absorbing means with respect to said longitudinal center-line upon said automatic self-tracking of said vehicle.

12. The invention according to claim 11 wherein said first and second equalizer bars comprise an elongated member having first, second and third bore holes extending therethrough at said forward end, said rear end and at a point substantially mid-way between said forward and rear ends, respectively, said bore holes all lying along parallel planes at an acute angle to the longitudinal axis of said equalizer bars, and further comprising a lateral bar interconnecting said first and second equalizer bars through said mid-way points on each of said first and second equalizer bars.

13. The invention according to claim 11 wherein said first and second equalizer bars further include an auxiliary leg having first and second ends with said first end of said leg extending from said mid-way point of said first and second equalizer bars, and said second end of said leg extending therefrom in a direction forming a Y with said equalizer bar, said second end of said leg mounted to said second rear axle housing and laterally spaced from said forward end of said equalizer bar.

14. The invention according to claim 12 wherein said bore holes are fitted with ball and socket joints.

15. The invention according to claim 13 wherein said second end of said leg on said first and second equalizer bars include a notch wherein said second rear housing axle is positioned.

16. The invention according to claim 14 and further comprising a sliding bearing operably positioned in said notch about said second rear axle housing whereby said leg may move longitudinally back and forth along said second rear axle housing about said notch upon said automatic self-tracking of said vehicle.

17. The invention according to claim 11 wherein said first and second equalizer bars comprise an elongated member having first, second and third bore holes extending therethrough at said forward end, said rear end and at a point substantially mid-way between said forward and rear ends, respectively, said forward and rear bore holes lying parallel to each other and substantially perpendicular to the longitudinal axis of said elongated member, and said bore hole at said mid-way point lying at an acute angle to said longitudinal axis of said elongated member, and further comprising a lateral bar interconnecting said first and second equalizer bars through said mid-way points on each of said first and second equalizer bars.

18. A method of retrofitting a vehicle suspension system having at least first and second rear axles including shock absorbers, said shock absorbers including means for lateral deflection, and first and second pairs of torque rods mounted to and extending from said at least first and second rear axles, respectively, and said frame, said torque rods each including forward and rear ends and lying substantially parallel to the longitudinal center-line of said vehicle, said method comprising the steps of:
a.) removing said forward ends of said torque rods from their respective said mountings;
b.) moving said forward ends of said first and second pairs of torque rods laterally inwardly toward each other, respectively, toward said vehicle center-line; and c.) re-mounting said forward ends of said first and second pairs of torque rods to one of said frame and said at least two rear axles.

19. A method of retrofitting a vehicle suspension system having at least first and second rear axles including shock absorbers and first and second pairs of torque rods mounted to and extending from said at least first and second rear axles, respectively, and said frame, said torque rods each including forward and rear ends and lying substantially parallel to the longitudinal center-line of said vehicle, said method comprising the steps of:
a.) removing said forward ends of said torque rods from their respective said mountings;
b.) moving said forward ends of said first and second pairs of torque rods laterally inwardly toward each other, respectively;
c.) re-mounting said forward ends of said first and second pairs of torque rods to one of said frame and said at least first and second rear axles, with said forward ends of said first and second pairs of torque rods being laterally spaced from each other; and
d.) modifying said shock absorbers to permit lateral deflection thereof.

20. Suspension apparatus in a non-articulated vehicle having first and second rear axles positioned and rotatable within respective first and second rear axle housings, at least one of said first and second rear axles being driven by a drive shaft connected and extending substantially perpendicular thereto along a longitudinal center-line, said vehicle further including a frame having first and second elongated members extending spaced and parallel on either side of said drive shaft, and further including a lateral support bar extending perpendicular to and interconnecting said first and second elongated members at a location approximately mid-way between said first and second rear axle housings, said suspension apparatus comprising:
a.) shock absorbing means connected to and between said frame and said first and second rear axle housings;
b.) first and second equalizer bars each having forward and rear ends, said rear ends of said equalizer bars connected to said first rear axle housing adjacent said elongated frame members, said forward ends of said equalizer bars extending therefrom in a direction laterally toward each other and said center-line and connecting to said second rear axle housing, said forward ends of said equalizer bars spaced laterally of each other a distance establishing separate reaction force points at each of said forward ends, said reaction force points operable to cause automatic self-tracking of said first and second axles upon turning of said vehicle; and
c.) means providing lateral movement of said shock-absorbing means with respect to said longitudinal center-line upon said automatic self-tracking of said vehicle, said shock absorbing means comprising:
i) first and second elongated leaf springs each having first and second ends with each of said first and second ends including a respective, integral finger portion extending in opposite, parallel directions to each other at substantially forty-five degree angles to the longitudinal axis of said spring, each of said first and second ends further including an elongated slot extending spaced and parallel to said respective finger portion, and further comprising first and second spring retaining elements anchoring said first and second ends to said first and second rear axle housings through said slots, respectively, said first and second spring retaining elements configured to permit angular movement of said first and second ends about said slots and with respect thereto along an axis parallel to said finger portions during said automatic self-tracking movement of said vehicle, and wherein said parallel axis of said first and second ends of said first leaf spring is substantially perpendicular to said parallel axis of said first and second ends of said second leaf spring.

* * * * *